United States Patent [19]

Mock et al.

[11] 3,942,156

[45] Mar. 2, 1976

[54] INDIRECT ARITHMETIC CONTROL

[75] Inventors: Howard C. Mock, Rancho Palos Verdes; Kenneth N. Isaac, Tustin; Charles P. Disparte; Warren L. Hall, both of Palos Verdes Peninsula, all of Calif.

[73] Assignee: Xerox Corporation, Stamford, Conn.

[22] Filed: Dec. 17, 1973

[21] Appl. No.: 425,352

[52] U.S. Cl. .............................................. 340/172.5
[51] Int. Cl.² .................. G06F 13/00; G06F 13/06
[58] Field of Search .................................. 340/172.5

[56] References Cited
UNITED STATES PATENTS

| | | | |
|---|---|---|---|
| 3,117,220 | 1/1964 | Wensley | 340/172.5 |
| 3,416,138 | 12/1968 | Brass | 340/172.5 |
| 3,487,369 | 12/1969 | King et al. | 340/172.5 |
| 3,560,933 | 2/1971 | Schwartz | 340/172.5 |

Primary Examiner—Gareth D. Shaw
Assistant Examiner—Michael C. Sachs
Attorney, Agent, or Firm—James J. Ralabate; Franklyn C. Weiss; Robert E. Cunha

[57] ABSTRACT

Circuits for the improved operation of microprogrammable computers are described. This improvement is accomplished by providing a set of read-only memory devices for storing the micro-code for all combinations of arithmetic logic unit function, carry bit and file register address than can be specified by an instruction word executed from Main Memory. In a universal microprogram designed to execute that family of Main Memory instructions that differ only in the functions specified above, the instruction word is used to address the read-only memory devices, the microcode output of which is used to control the file, carry in bit and arithmetic logic unit. Through the use of these circuits a family of instructions may be executed by a single microprogram and at no increase in execution time over that required for the execution of a microprogram dedicated to a single instruction.

17 Claims, 5 Drawing Figures

INDIRECT ARITHMETIC CONTROL

BACKGROUND OF THE INVENTION

This invention relates to data processing equipment and more particularly to an improved circuit for indirect arithmetic control of some of the central processing unit functions. Use of this circuit allows a microprogrammable computer to execute a family of instructions in the number of locations required for a single microprogram.

In a typical microprogrammable computer there is a Main Memory containing programs and data words and a Control Memory containing microprograms. Using the computer described herein as an example, an application program stored in Main Memory is composed of words 16 bits in length which specify an operation and the location in Main Memory or in the File of the data to be operated upon. To execute a Main Memory instruction the operation code must be translated into a series of steps involving the operation of circuit elements within the computer. This translation from a Main Memory instruction into a series of hardware steps is accomplished through the execution of a microprogram in the Control Memory.

An example of a Main Memory instruction would be the "Register Exclusive OR And Increment" instruction which exclusive OR's the contents of source and destination registers, increments the result by 1 and loads the final result into the destination register. The single instruction obtained from Main Memory is translated into the eventual series of steps by using the original Main Memory instruction to "call" a microprogram located in the Control Memory which orders all of the steps necessary to implement said Main Memory instruction. Another instruction in the vocabulary of this computer is a "Register OR And Increment" instruction wherein the computer logically OR's the contents of a source and destination register, increments the result by one and loads the final result into the destination register. It can be seen that the difference between the two described instructions is that in one the basic operation is a Logical Exclusive OR and in the other the instruction is a Logical OR. The most basic method of translating these instructions into hardware steps is to use a separate microprogram for each instruction. Of course, this increases the size of the Control Memory required.

An improvement over the above system is to provide within the central processing unit a four bit function register to specify which particular logical or arithmetic operation is required of the Arithmetic Logic Unit (ALU). Thus, a single program can be used to implement both instructions by loading the function register with the four bit code of the operation required, running a single microprogram, and at the appropriate point in that microprogram use the contents of the function register to indirectly specify the operation of the Arithmetic Logic Unit rather than specifying it directly through bits of the microprogram instruction.

One problem with this system is that a separate loading step is required at the beginning of the microprogram which slows down instruction execution time. Another problem is that this system can be used for that family of instructions that differs only in its Arithmetic Logic Unit function. It would be advantageous to have a system which allows for instructions that differ in File locations and in the way the Carry Input is handled as well.

SUMMARY OF THE INVENTION

This invention allows for the provision of a single microprogram to process that family of instructions that differ in their Arithmetic Logic Unit function, their File location, and the way they handle the Carry Input without increasing the execution time over what it would be if each instruction had its own dedicated microprogram. This is accomplished by loading a set of read-only memory (ROM) devices with every desired combination of Arithmetic Logic Unit function, File address and Carry Input function. At the appropriate time in the execution of the Control Memory microprogram, the Arithmetic Logic Unit, File and Carry control lines are activated not by the microprogram but by the contents of a selected ROM.

Also, no time is lost using this technique since a ROM need not be clocked the way a register is clocked, the information programmed into a ROM is available at the output immediately upon being addressed. Therefore, one instruction execution cycle is saved by using ROM's as compared to a function register since a function register must be loaded during the execution cycle but a read-only memory device is pre-loaded at the time it is programmed.

Thus, this invention represents a significant improvement over the prior art in that, by the addition of this circuit, a single microprogram can process any one of a large set of instructions in the same time it would take to process a single instruction through the use of a microprogram written specifically for that instruction.

DETAILED DESCRIPTION OF THE INVENTION

Figure 1:
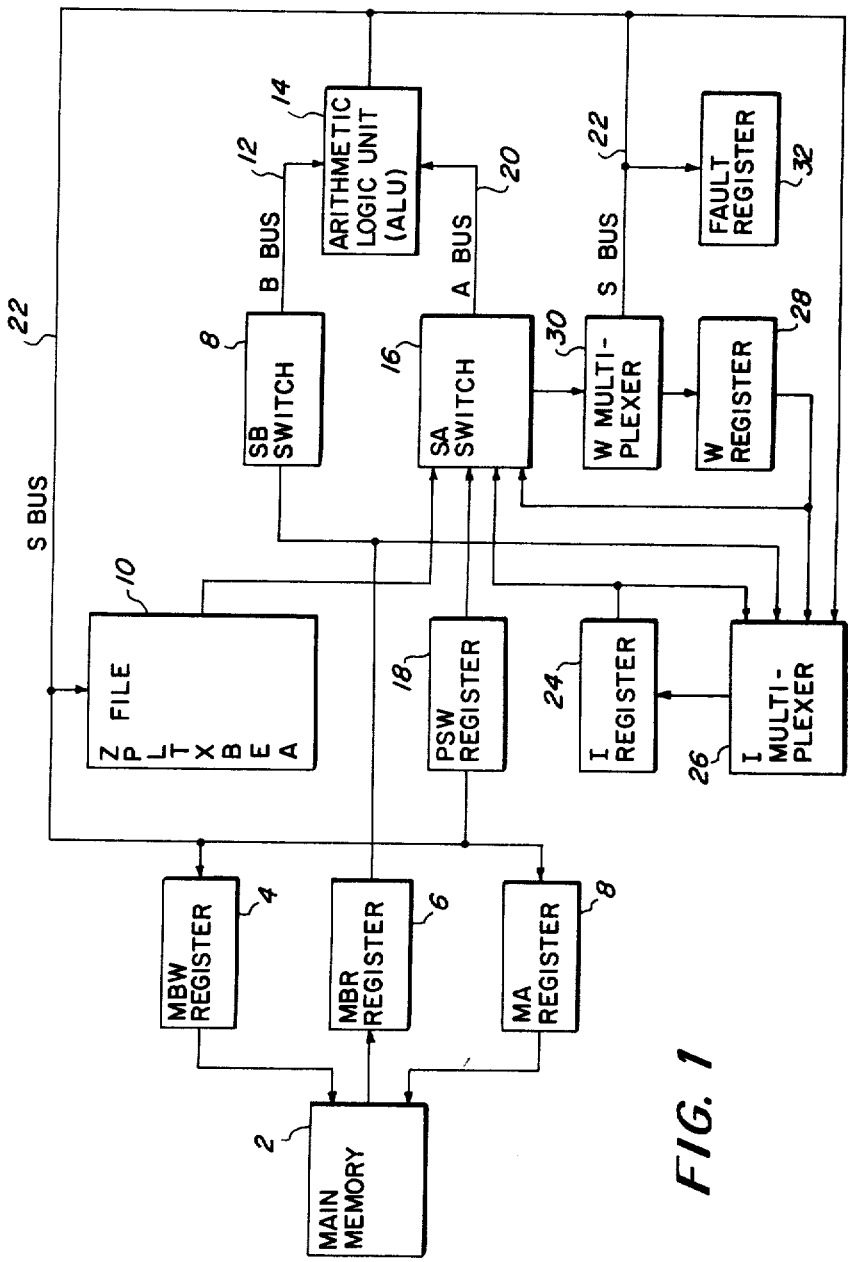
FIG. 1 is a block diagram of the main elements of the computer in which this invention is used.

FIG. 1 is a simplfied block diagram of those elements of the computer which are used in conjunction with this invention.

The Main Memory 2 contains up to 64,000 words of 16 bits each. The MBW Register 4 stores words to be loaded into the Main Memory 2, and the MBR Register 6 contains words that have been read from Main Memory 2. The MA Register 8 contains the address of the next location in Main Memory 2 to be loaded into or read from.

The General Register File 10 is composed of nine random access memory devices. Since each device has a 32 by 2 bit capacity, these nine devices provide storage for 32 words of 16 bits each plus two parity bits, one for each byte. The File is controlled by six control lines, five lines for the address bits and one line for read-write control. Since the File acts like any synchronous flip-flop or register, during one CPU clock period data may be read out of a File location, operated on by the Central Processing Unit and written back into the same or a different File location at the end of the clock period. The File receives its data from the S Bus 22, and its output goes to the SA Switch 16.

The first 8 locations of the File are available to the software programmer and have the following specific functions. Z is a zero source. P is the address of the current instruction in the Main Memory program. L is the link address. T is for temporary storage. X is index register number 1, used for post-indexing. B is index register number 2, used for pre-indexing. E is the extension of the Accumulator and A is the accumulator. The remaining 24 locations are available only to the microprogrammer and are used by him as working File locations for any purpose and are referred to as File Eight through Thirty-One.

Figure 2:
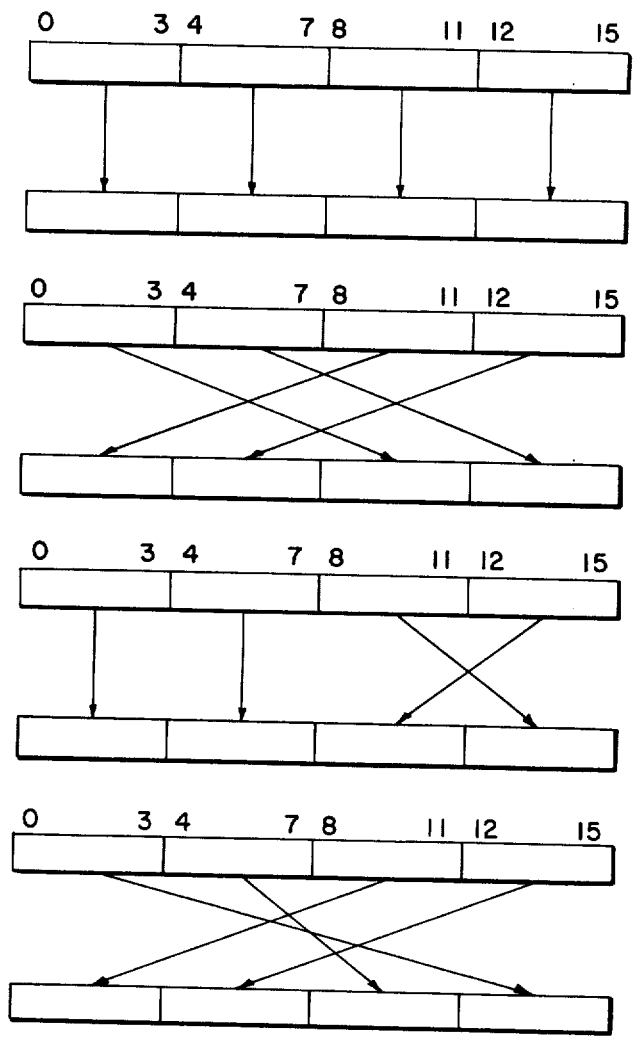
FIG. 2 shows the four data-swapping options available when loading the I Register.

The I Register 24 is a 16 bit flip-flop register whose output is used within the Central Processing Unit and is available only to the microprogrammer. The entire sixteen bit output of the I Register may be transferred through the SA Switch 16 and the Arithmetic Logic Unit 14 back into the I Multiplexer 26 to the I Register 24. This loop is used when the 16 bits are modified by some arithmetic or logic operation. A second path of data transfer is from the I Register 24 into the I Multiplexer 26 and back into the I Register 24. This loop is used for data manipulation as shown in FIG. 2. As seen in FIG. 2 the total affect of the four possible manipulations in the I Multiplexer is that any four bit nexidecimal in the I Register may be put into the least significant end of the I Register in one direct operation. This allows reformatting of the I Register data simultaneously with an ALU Operation. The least significant eight bits of the I Register are also used as the address inputs to the four indirect control ROMs as will be explained below. The I Multiplexer 26 may also receive information from the S Bus 22, the W Register 28 and the MBR Register 6. In all cases, this data may be manipulated as shown in FIG. 2. Two control lines are used to order one of the four possible data swaps shown in FIG. 2. Two more lines are used to determine which input shall be selected.

The W Register 28 is a 16 bit flip-flop used as a working register. It is loaded from the S Bus 22 or the SA Switch 16 through the W Multiplexer 30 and is also used by the microprogrammer as a dynamic display of the next instruction Main Memory address on the control panel not shown.

The SB Switch 8 is a one-out-of-eight signal selector. The only input of interest in a discussion of this invention is the input from the MBR Register 6 which multiplexes the output from Main Memory 2 to the Arithmetic Logic Unit 14 for processing.

The SA Switch 16 is a one-out-of sixteen signal selector. Inputs to the SA Switch include the output from the File 10, the I Register 24, the W Register 28, and the Program Status Word Register 18. The Program Status Word Register 18 contains the Overflow and Carry bits.

The Arithmetic Logic Unit (ALU) 14 is composed of four arithmetic logic circuits, each of four bits capacity, and a fast carry look-ahead circuit. Four control lines are used to order one of the ALU's 15 arithmetic and logic functions. The inputs to the ALU 14 are the output of the SB Swtich 8 which is transferred to the ALU through the 16 parallel bit B Bus 12, and the output of the SA Switch 16 which is transferred to the ALU through the A Bus 20. The output of the ALU 14 is carried by the S Bus 22 to the various elements of the Central Processing Unit.

A Fault Register 32 may be loaded from the S Bus 22 with fault data generated by the execution of a Control Memory diagnostic microprogram or by a Main Memory diagnostic program. The contents of the Fault Register are displayed at the control panel, not shown.

In FIG. 1, the File 10, the Arithmetic Logic Unit 14, the SA Switch 16 and the I Multiplexer 26 are representations of commercially available devices (or groups of identical devices in parallel), and are fully documented in Specification Sheets published by various vendors. The Arithmetic Logic Unit, for instance, which has just been described, is implemented from standard commercial devices sold by Texas Instruments Inc., and Signetics as Model No. 54181. Likewise, the SA Switch is implemented from 74151's, the I multiplexer from 74153's, and the File from 82521's.

Figure 3:
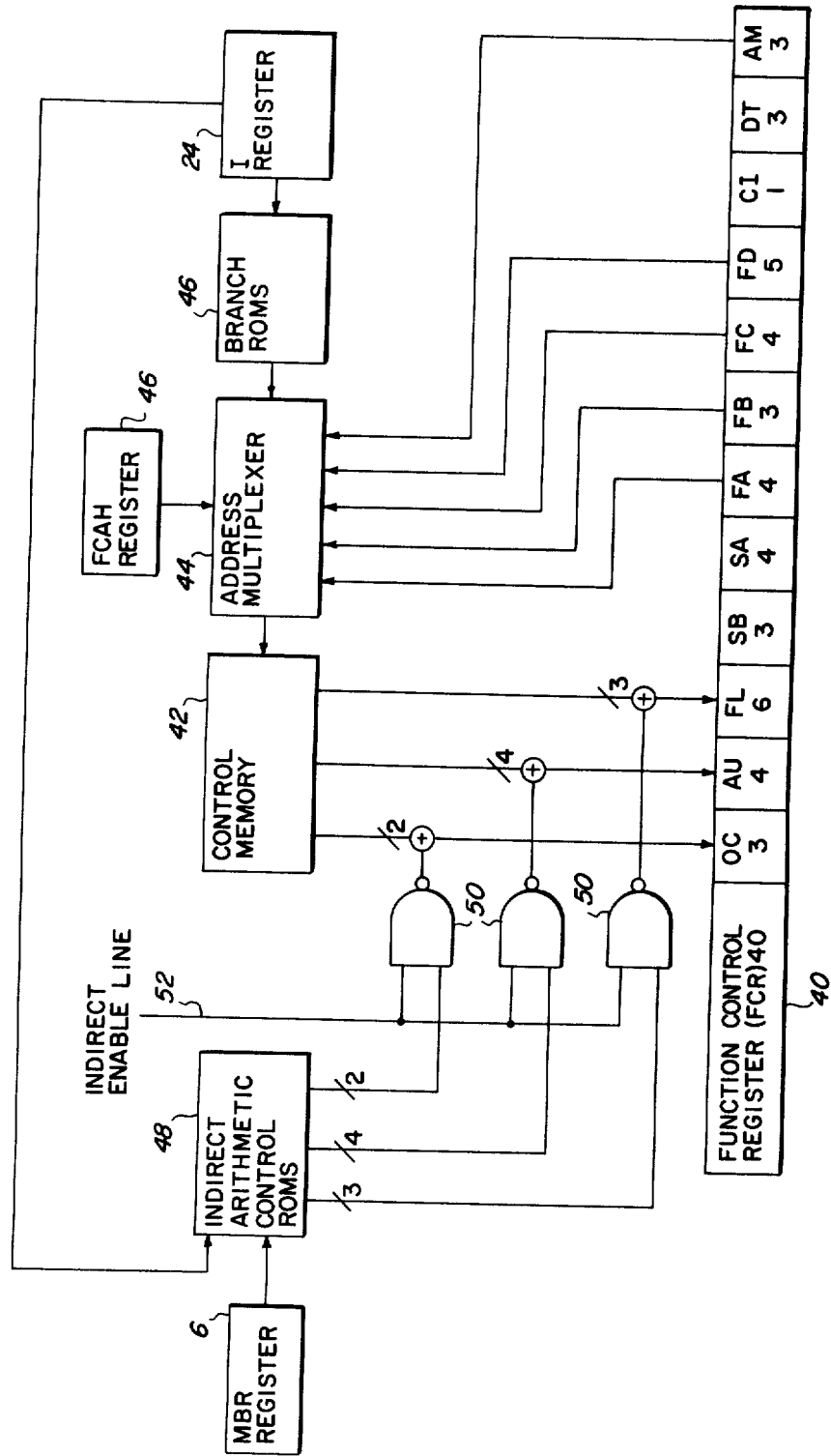
FIG. 3 is a block diagram of the circuits required to load the FCR Register.

Sixty lines are required to control the hardware shown in FIG. 1. For instance, the ALU 14 is capable of 15 different arithmetic or logic operations and therefore needs four control lines to specify the operation required by the current instruction. Three lines are required for the SB Switch to determine which input to apply to the B Bus 12 and the 32 word File 10 requires five addressing lines to specify which location is being accessed. These control lines emanate from the Function Control Register (FCR) 40 which is shown in FIG. 3. The Control Memory 42 loads all 60 bits of the FCR 40 but for clarity only the subfields pertaining to this invention are shown. Furthermore, except for some of the loading lines which load the OC, AU and FL fields from the Control Memory 42, the loading lines have also been omitted.

In the embodiment, described herein, all of the microprograms in the Control Memory are contained within a block of read-only memory devices. The total length of the control microprogram is approximately 2,000 words and each word is 60 bits in length. As each instruction is accessed from the Control Memory 42 these 60 bits are loaded into the Function Control Register 40. These 60 bits are divided into fields based on their function and the pertinent ones are described below.

The FL (File Control) six bit field in the FCR 40 controls the 32 word File 10. During any one cycle, one word can be accessed from this File, operated on by the ALU 14, and written back into the File. The field is divided into two sub-fields, a five bit address field and a one bit control field which determines the operation, read or read/write.

The SA Field determines what function is to be placed on the sixteen bit wide A Bus 20 which is one of the two inputs to the ALU and also is an input to the W Register Multiplexer 30.

The SB Field of the FCR 40 determines what function is to be placed on the sixteen bit wide B Bus 12 which is the other input besides the A bus 20 to the ALU 14. This multiplexer has the capability for eight separate inputs including the output of the MBR Register 6.

The four bit AU field controls the operation of the ALU 14. The arguments for the function performed are on the A Bus 20 and the B Bus 12 in FIG. 1 with the result appearing on the S Bus 22.

The CI Field of the FCR 40 in FIG. 3 contains one bit which is used as either a "zero" or "one" input to the Carry flip-flop, a part of the PSW Register 18.

The DT Field controls the loading of the destination register from the S Bus 22 at the end of the current cycle. The destination register may be the MA Register 8, the MBW Register 4, the PSW Register 18, the Fault Register 32 or the I Multiplexer 26. The File 10 and the W Multiplexer 30 are controlled separately.

The OC field is a three bit field which is used to set or reset the Overflow and Carry indicators at the end of the current cycle. The software developed for this computer makes extensive use of these indicators for non-arithmetic functions, in that, these bits are used as flag bits by the software programmer. The Overflow and Carry flip-flops are part of the PSW Register 18.

The FCR 40 is also loaded from the Control Memory 42 with 16 bits of address information. This information is stored in the FA, FB, FC and FD Fields and is sent to the Address Multiplexer 44 along with the least significant eight bits from the I Register 24 and addressing information from the FCA +1 Register 46. The Address Multiplexer 44 is ordered to select one of several branching modes by the three bits of information in the AM Field of the FCR Register 40.

For direct addressing the 16 bits of addressing information are selected by the Address Multiplexer 44 and are used directly to specify the next Control Memory location to be accessed.

Alternatively, the FCA +1 Register 46, which always contains an address numerically equal to the current address plus one, may be selected by the Address Multiplexer 44 in which case the next location after the current location will be accessed. Use of this addressing mode will result in a program being executed in numerical sequence.

Another addressing mode is an indirect mode where the least significant eight bits of the I Register 24 are used as address bits to address a group of Branch ROMs 46. The Branch ROM output is used as addressing information, is selected by the Address Multiplexer 44 and is used as the address of the next word of microprogram in Control Memory 42.

The Indirect Arithmetic Control ROMs 48 receive addressing information from the I Register or the MBR Register 6, and the outputs from these Indirect Arithmetic Control ROMs are switched through nine gates 50 into the OC, AU and FL Fields. These NOR gates 50 are under the control of the Indirect Enable Line 52 which is a decode of the AM Field.

If the microprogrammer wants to control the ALU, the File and the Carry bit directly, he does not activate the Indirect Enable Line and loads the OC, ALU and FL bits of the Function Control Register 40 directly from Control Memory 42.

If the microprogrammer wants to exercise the Indirect Arithmetic Control option, he activates the Indirect Enable line and allows the outputs of both the Control Memory 42 and the Indirect Arithmetic Control ROMs 48 to be collector ORed prior to using the result to load the Function Control Register. When this option is exercised, all nine outputs from the Control Memory 42 must be high so that the information loaded into the Function Control Register 40 is solely dependent upon the information from the Indirect Arithmetic Control ROMs 48.

It can be seen that only three of the six FL Field bits may be loaded indirectly. This means that the software programmer has control over which one of eight registers will be loaded while the microprogrammer has control over which eight out of 32 registers will be enabled. This is required since the software programmer does not "know" that there are thirty-two locations in the file. He only knows of the eight named registers located in File zero through seven, and therefore in the translation of an operation code in the current Main Memory instruction only one of these eight register locations need be specified.

Two lines are needed for control of the OC Field the three Carry options which are zero, one and normal carry. Finally, four lines completely control the Arithmetic Logic Unit.

Figure 4:
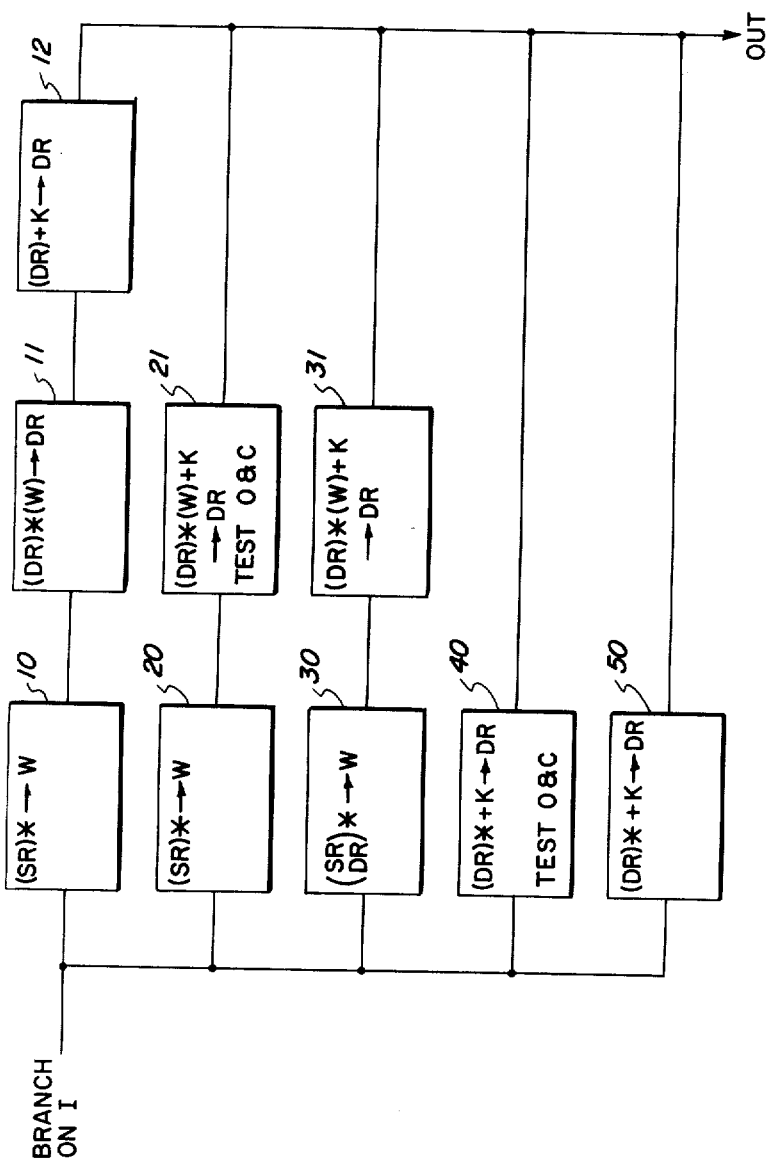
FIG. 4 is a flow chart of the microprogram used in conjunction with the Indirect Arithmetic Control circuits.

FIG. 4 is a simplified block diagram of the register copy microprogram in Control Memory. Because of the indirect arithmetic control circuits this short program implements a wide variety of register copy instructions. The contents of any File register may be copied into any other File register. The data contained in a source register may be combined in a variety of logic or arithmetic functions with the contents of a destination register and the result loaded into the destination register. Finally, the three carry options are available.

At the immediately preceeding step of the microprogram, a multi-way branch on the I Register is made. At this point in the program, the I Register contains the software code specifying the source register, the destination register, and the operation code. The program will branch to the appropriate location based on these contents of the I Register.

Copy instructions require either one, two, or three execution machine cycles in addition to this branching step. One step copy executions arise in cases where one register is zeroed or made all ones. The carry, if any, is assimilated in this one step. This is shown in logical notation in location 50 where the contents of the destination register may be zeroed or made all ones; may be incremented by one, incremented by the contents of the carry flip-flop or not incremented at all; and loaded into the destination register. For operation codes that order a test of the overflow and carry flip-flops, a separate path through location 40 is provided.

Most of the copy cases require two execution steps. At location 20 the content of the source register is loaded into the W Register. In location 21 the contents of the destination register is combined with the contents of the W Register in any of the specified ALU arithmetic or logic functions, incremented as before and loaded back into the destination register. A test for an overflow or carry is also provided at location 21. The instructions in locations 30 and 31 are executed when either the destination or source register is logically combined with the destination register and incremented before being loaded into the destination register.

Three step copies arise from ALU hardware constraints where "AND" and "exclusive OR" operations require an additional step for carry assimilation. This is indicated in locations 10, 11, and 12 where the contents of the source register is loaded into the W Register, arithmetically or logically combined with the contents of the destination register, incremented and finally loaded into the destination register.

Figure 5:
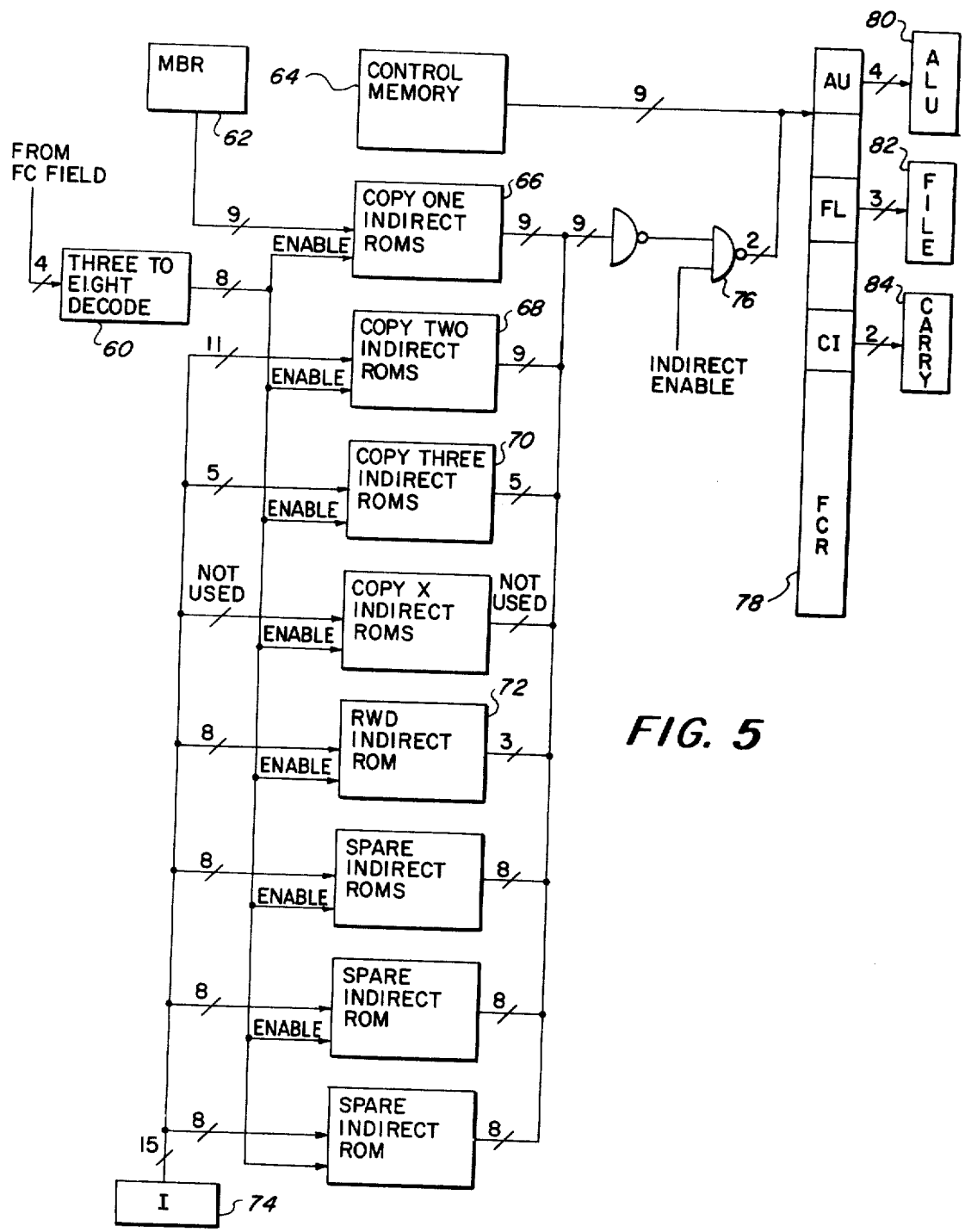
FIG. 5 is a simplified schematic diagram of the Indirect Arithmetic Control circuit.

The circuit required to implement the microprogram of FIG. 4 is shown in schematic form in FIG. 5. There are eight sets of Indirect ROMs of which three are used for copy instructions, one is used to control the File indirectly, and four are either kept as spares or not used.

The first indirect copy ROM, Copy One 66, is enabled during step one (locations 10, 20, 30, 40 and 50 in FIG. 4) of copy execution and overlays (collector ORs) three of the FL field bits, four of the AU bits and the two CI bits in the FCR 78. Prior to this instruction execution the MBR Register 62 and the I Register 74 had been loaded with the operation code and contains the source register, the destination register and operation code information. By using the data contained within the MBR Register to address the Copy One Indirect ROM, and by using the output of the ROM to load the FCR 78, then the ALU 80, File 82 and Carry 84 function are indirectly determined by the operation code in the MBR Register at the time of execution.

The copy Two 68 (locations 11, 21 and 31 in FIG. 4) and Copy Three 70 (location 12) Indirect ROMs are enabled during the second and third steps of copy. Their outputs are a function of the contents of the I Register 74 which holds the operation code and register information during the second and third copy steps thus freeing the MBR Register for other uses.

As explained above, the 16 address field bits may be used directly to determine the next control Memory location to be accessed. If, however, a branch on the contents of the I Register or MBR Register is made, the FC Field data is not used and three of these bits are therefore available to enable one of the eight Indirect ROMs. This is shown in FIG. 5 as the input to the Three to Eight Decode 60.

Under Indirect Arithmetic control conditions, the indirect enable line is active, enabling up to nine bits of information to be transferred from the Indirect ROMs to the FCR Register 66 where they are collector ORed with the output of the Control Memory 64. Simultaneously, all nine outputs of the Control Memory 64 must be held high so that, through collector ORing, the inputs of the FCR Register will equal the outputs from the indirect ROMs.

The RWD Indirect ROM 72 is used with that family of operation codes that vary only in the File address and so only the three lines going to the FL field are implemented. The remaining ROMs are spares to be programmed in the future in case additional options are desired.

It is to be understood that the above described arrangement is merely illustrative of the principals of the invention. For example, other circuit implementations or other read-only memory devices could be used to obtain the results of this invention. While particular embodiments of the present invention have been described and illustrated, it will be apparent to those skilled in the art that changes and modifications may be made therein without departure from the spirit and scope of the invention as claimed.

What is claimed is:

1. In a microprogrammable computer of the type having data registers, an arithmetic logic unit, control lines for controlling the transfer of data between said data registers and said arithmetic logic unit, and a control memory comprising first circuit for storing microprograms and second circuit for executing said microprograms and for coupling the control information generated by said microprogram execution to said control lines, an improved indirect arithmetic control circuit comprising:

addressable memory means for storing indirect arithmetic control information, addressing means for coupling the data from one of said data registers to said addressable memory means address inputs, and gating means responsive to a microprogram indirect arithmetic control instruction currently being executed by said control memory second circuit for coupling said indirect arithmetic control information to said control lines.

2. The apparatus as set forth in claim 1 wherein said addressable memory means comprises a plurality of read-only memory devices.

3. The apparatus as set forth in claim 2 including selecting means coupled to said control memory and responsive to an indirect arithmetic control microprogram instruction execution by said second circuits for selecting one of said read-only memory devices and for coupling the output of said selected read-only memory device output to said control lines.

4. The apparatus as set forth in claim 1 wherein said gating means further comprises a set of two-input OR gates, the input of said OR gates being coupled to said control memory and said addressable memory means, and the output of said gates being coupled to said control lines.

5. In a microprogrammable computer of the type having control lines for controlling the flow of data between the data registers and the arithmetic logic unit of said computer, and a control memory comprising first circuit for storing microprograms and second circuit for executing said microprograms and for coupling the control information generated thereby to said control lines, an improved indirect arithmetic control circuit comprising:

a read-only memory device for storing indirect arithmetic control information, addressing means for coupling the data from one of said data register outputs to said addressable memory means address inputs, and gating circuit for coupling the outputs of said read-only memory device to said control lines, responsive to the execution of an indirect arithmetic control microprogram instruction being executed by said control memory second circuit.

6. The apparatus in claim 5 wherein said gating circuits for coupling comprise OR gates for combining each output bit from said read-only memory device with each corresponding output bit from said control memory second circuits and for coupling the resultant signals to said control lines.

7. The apparatus as set forth in claim 5 wherein said read-only memory device is addressable.

8. The apparatus as set forth in claim 7 wherein the addressing line inputs to said read-only memory device are coupled to the output lines of one of said data registers.

9. The apparatus as set forth in claim 5 wherein said read-only memory device comprises a plurality of read-only memory chips.

10. The apparatus as set forth in claim 9 including means responsive to the execution of an indirect arithmetic control microprogram instruction by said second circuits of said control memory for selecting one of said plurality of read-only memory chips and for coupling the output of said selected read-only memory chip to said control lines.

11. The apparatus as set forth in claim 10 wherein each of said plurality of read-only memory chips is addressable by one of said data registers.

12. In a microprogrammable computer of the type having control lines for controlling the flow of data between the data registers and arithmetic logic unit of said computer, a function control register for driving said control lines, and a control memory for storing microprograms in a first circuit of said control memory and for executing said microprograms and for outputting the control information generated by a said microprogram execution by second circuit of said control memory, an improved indirect arithmetic control circuit comprising:

a read-only memory device for storing indirect arithmetic control information, gating circuits for coupling the outputs of said control memory and said read-only memory device to said function control register, and means responsive to the execution of an indirect arithmetic control instruction by said second circuit of said control memory for coupling the output of said read-only memory device to said control lines.

13. The apparatus as set forth in claim 12 wherein said gating circuits comprise an OR gate for each output bit of said read-only memory device, the inputs to each of said gates being the corresponding output bits of said read-only memory device and said second circuits of said control memory, and the output of each of said gates being coupled to the corresponding bit of said function control register.

14. The apparatus as set forth in claim 13 wherein said read-only memory device is addressable.

15. The apparatus as set forth in claim 15 wherein said read-only memory device comprises a plurality of read-only memory chips.

16. The apparatus as set forth in claim 15 including means responsive to the execution of a control memory indirect arithmetic control microprogram instruction by said control memory second circuits for selecting one of said read-only memory chips, and for coupling the output of said selected read-only memory chip to said control lines.

17. The apparatus as set forth in claim 16 wherein the addressing information to each of said plurality of read-only memory chips is coupled from one of said data registers.

* * * * *